United States Patent
Pawlowski, Jr.

[11] Patent Number: 5,646,664
[45] Date of Patent: Jul. 8, 1997

[54] INK CONTAINER VALVING

[75] Inventor: Norman E. Pawlowski, Jr., Corvallis, Oreg.

[73] Assignee: Hewlett-Packard Company, Palo Alto, Calif.

[21] Appl. No.: 374,363

[22] Filed: Jan. 18, 1995

[51] Int. Cl.⁶ .................................................. B41J 2/175
[52] U.S. Cl. .................................................. 347/86
[58] Field of Search .................. 347/86, 87; 137/625.22, 137/625.47

[56] References Cited

U.S. PATENT DOCUMENTS

| | | |
|---|---|---|
| 4,187,512 | 2/1980 | Matsunaga et al. ............... 346/140 R |
| 4,234,885 | 11/1980 | Arway . |
| 4,323,907 | 4/1982 | Italiano . |
| 4,385,898 | 5/1983 | Jordan ............................ 137/625.22 |
| 4,429,320 | 1/1984 | Hattori et al. . |
| 4,677,447 | 6/1987 | Nielsen ............................ 347/86 |
| 4,714,937 | 12/1987 | Kaplinsky ........................ 347/86 |
| 4,770,740 | 9/1988 | Tsuzuki et al. . |
| 4,831,389 | 5/1989 | Chan ............................... 347/86 |
| 4,907,019 | 3/1990 | Stephens ........................ 346/140 R |
| 4,959,667 | 9/1990 | Kaplinsky ........................ 347/87 |
| 4,967,207 | 10/1990 | Ruder ............................. 347/86 |
| 4,968,998 | 11/1990 | Allen .............................. 347/86 |
| 4,999,652 | 3/1991 | Chan .............................. 347/87 |
| 5,126,767 | 6/1992 | Asai ............................... 347/86 |
| 5,280,300 | 1/1994 | Fong et al. ....................... 347/86 |

FOREIGN PATENT DOCUMENTS

| | | | |
|---|---|---|---|
| 0386475A1 | 9/1990 | European Pat. Off. ........ | B65D 47/26 |
| 1219390 | 5/1960 | France . | |

*Primary Examiner*—Valerie Lund

[57] ABSTRACT

The valving assembly includes an ink container, a valve body, a rotatable valve having a conduit, a receptacle configured to mate with the conduit and a rotatable valve actuator. The ink container is mounted to the valve body that receives the rotatable valve therein. The valve is rotatable into a position that permits ink to flow from the container. The valve is firmly held against the valve body to prevent leaks from the closed valve. The container, valve and valve body are all formed of the same plastic material, thereby to facilitate recycling of the ink container with its valve.

19 Claims, 4 Drawing Sheets

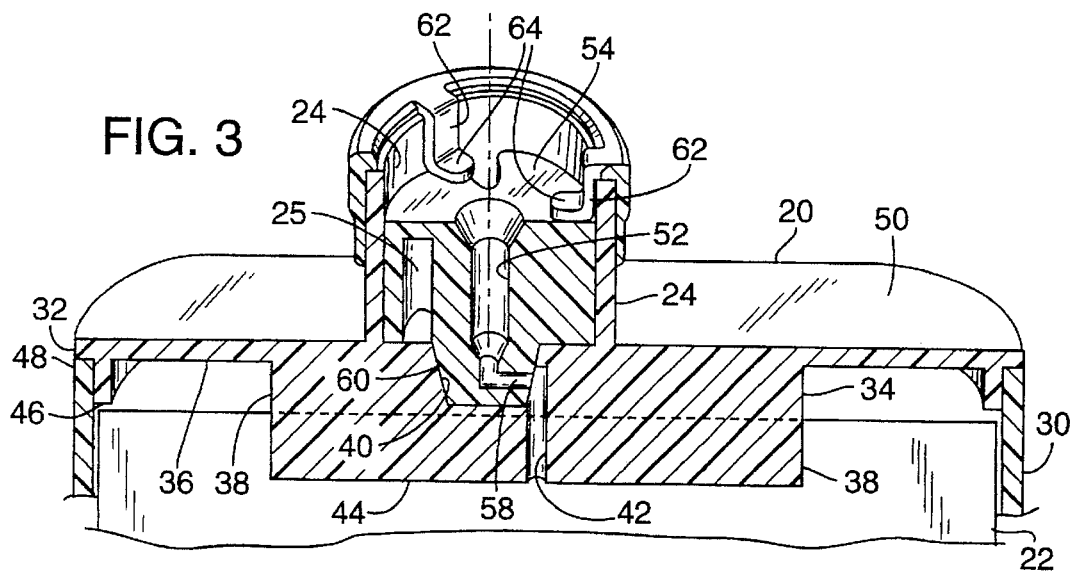
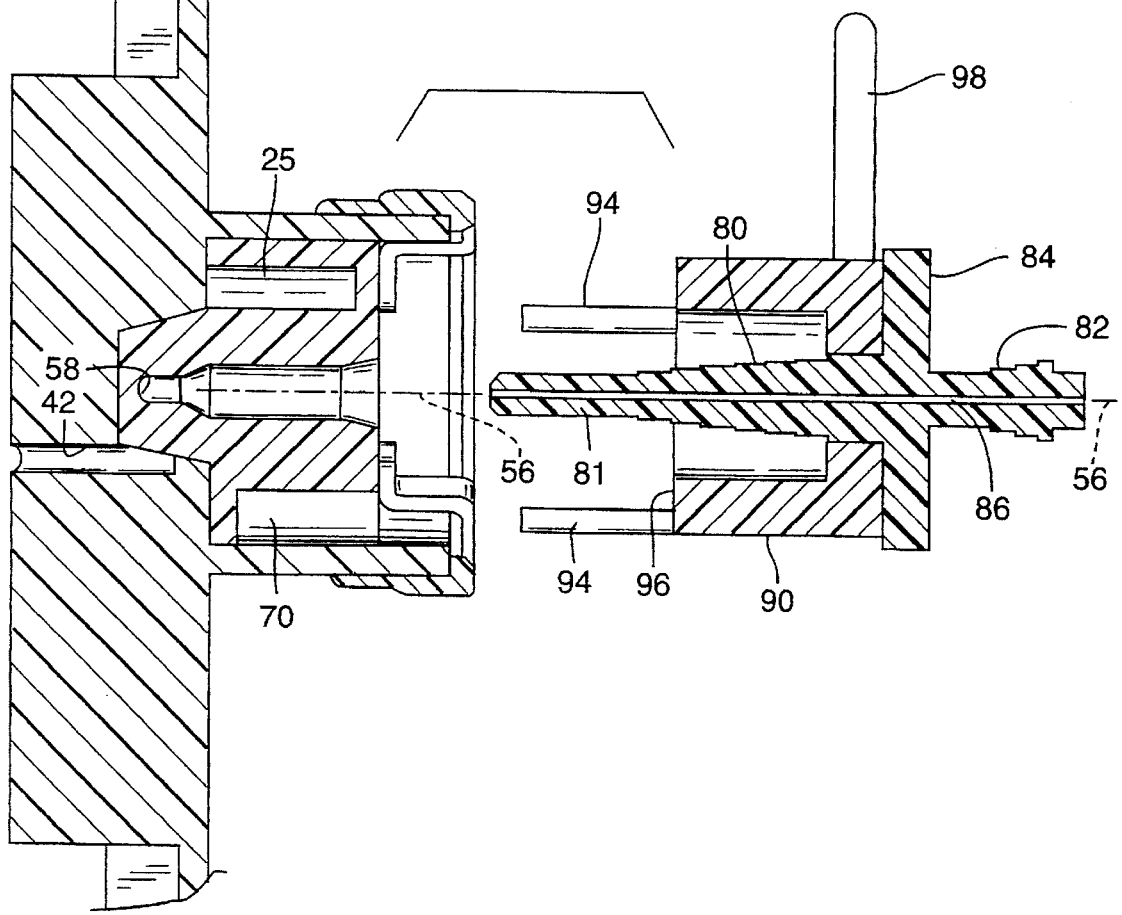

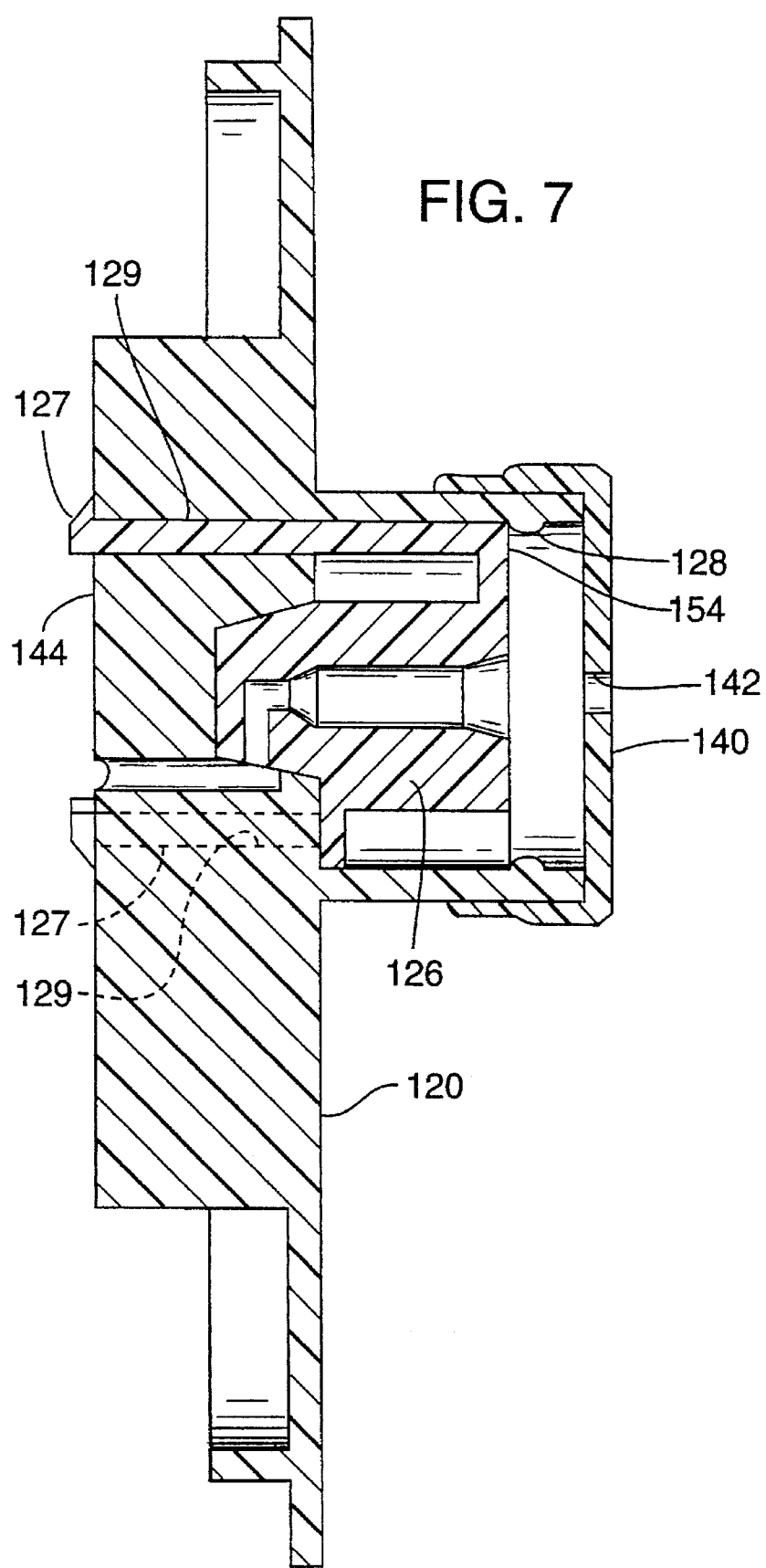

5,646,664

INK CONTAINER VALVING

TECHNICAL FIELD

This invention relates to valving of replaceable ink containers that supply ink to the print heads of ink-jet printers.

BACKGROUND INFORMATION AND SUMMARY OF THE INVENTION

Ink-jet printers include print heads that are located adjacent to paper that is advanced through the printer. Print heads include mechanisms for ejecting minute droplets of ink onto the paper, thereby to form characters or an image on the paper.

Many ink-jet print heads include reservoirs that comprise the sole supply of ink for the print head. Other print heads may be permanently or occasionally connected to an ink supply container that is mounted stationary within the printer for supplying the ink to the print head. In these latter types of ink supply systems, it is necessary to replace empty ink containers with full ones. Moreover, a user may wish to disconnect a partly full ink container and replace it with a completely full ink container in instances where the user is faced with a large printing task and does not wish to interrupt the printing task in order to replace a partly full container when it becomes empty. In any event, it is desirable that the container includes valving that permits the disconnection of empty or partly empty containers from the printer without leaking ink.

In the past, mechanisms for providing leak-free valving of ink containers have included the use of spring mechanisms, or valves having elastomeric seats or other components. Such valving techniques employ components made of dissimilar materials and, therefore, are difficult to recycle without disassembling the valves to sort the dissimilar materials. Moreover, such valves are susceptible to failure in extreme environmental conditions, such as freezing. Further, such valves may leak or otherwise fail if the ink container is dropped.

This invention is directed to easily manufactured valving for an ink container. The valving is constructed so that all of the components of the valving may be made from the same material, thereby greatly simplifying the recycling of the container since no sorting of the components is necessary.

The valving of the present invention provides a robust seal to prevent leakage of ink through the valve. Moreover, the valving is sturdy to resist opening or leaking in the event the valved container is dropped or otherwise exposed to extreme environmental conditions.

In a preferred embodiment of the invention, there is provided a rotatable valve that is carried by the ink container. The valve may be engaged by a valve actuator when the container is placed within the printer. The valve actuator opens the valve after a seal is made between the valve and a receptacle that receives the ink from the container.

BRIEF DESCRIPTION OF THE DRAWINGS

FIG. 3 is a cross-sectional view of the assembled valving.

FIG. 4 is a cross-sectional view of the valving shown adjacent to a receptacle and valve actuator that may be employed with the present invention.

FIG. 7 is a cross-sectional view of an alternative embodiment of ink container valving of the present invention.

DESCRIPTION OF PREFERRED EMBODIMENTS

Figure 1:
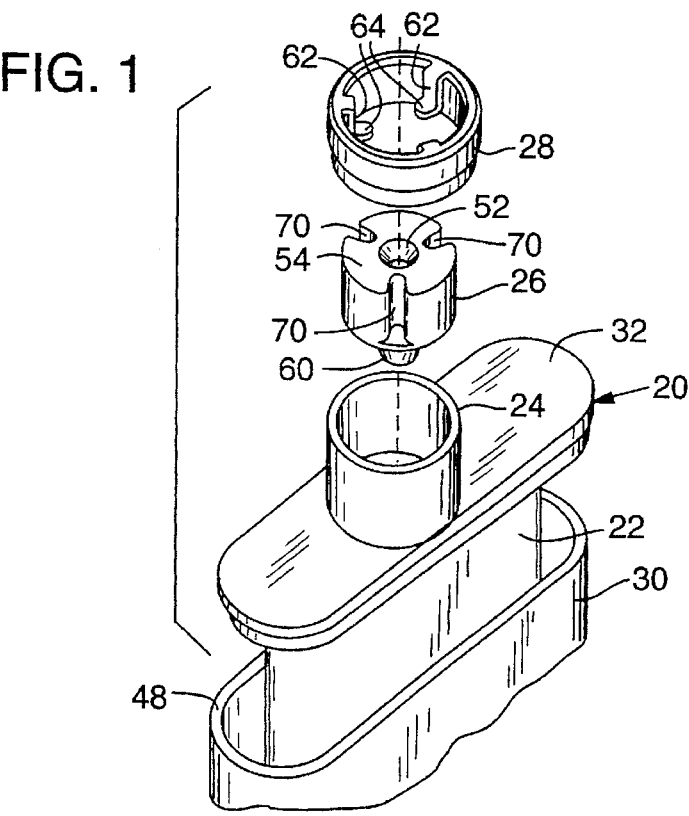
FIG. 1 is an exploded view showing the primary components of the ink container valving of the present invention.
Figure 2:
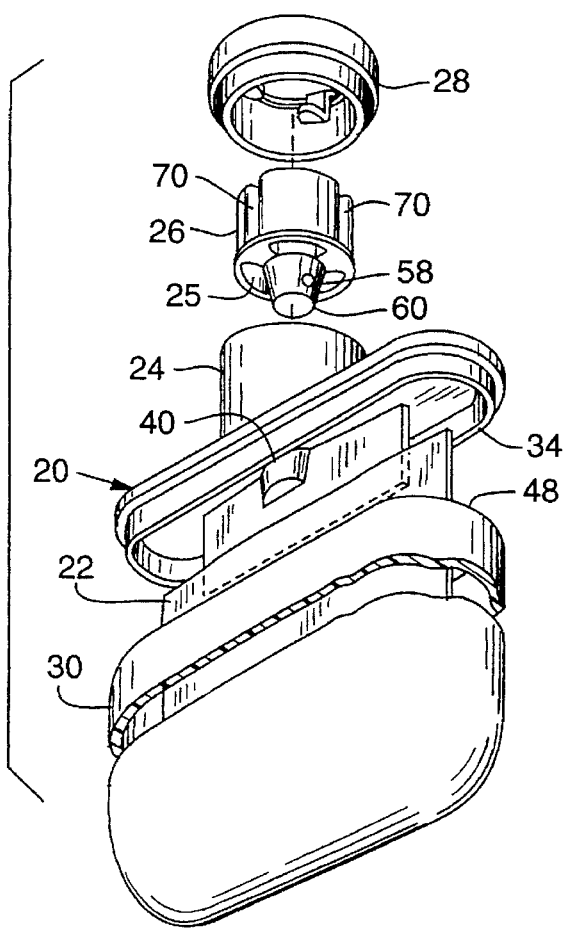
FIG. 2 is another exploded view, generally opposite the view of FIG. 1.

Referring to FIGS. 1-3, there is shown the primary components of the ink container valving of the present invention. Included is a valve body 20 to which a limp, collapsible, plastic ink container 22 is attached to one side thereof. The ink container 22 may be made from thin sheets of high-density polyethylene, the edges of which are heat-staked to define the ink-containing interior of the container.

The valve body includes a holder 24 that receives a rotatable valve 26. The valve is retained within the holder by a keeper 28. The limp ink container 22 is encased within a rigid shell 30 that is mounted to the valve body 20. As will be explained more fully below, the valve 26 may be rotated into and out of an open position to permit ink to flow from the container 22 through the valve and into a suitable receptacle.

The valve body is preferably formed of high-density polyethylene and includes a substantially flat base 32 that has rounded corners. An integrally formed manifold 34 projects from the underside 36 of the base 32. The manifold is substantially flat, except the central portion of the manifold is slightly thicker than the side edges 38 of the manifold.

As best shown in FIGS. 2 and 3, the central portion of the manifold is further thickened so that the manifold walls define a generally frustum-shaped valve seat opening 40. A port 42 (FIG. 3) is defined in the manifold 34 and extends from the valve seat opening 40 through the manifold to open in the inner edge 44 of the manifold. The bag-like ink container 22 is heat-staked or otherwise attached to the manifold 34 to enclose the port 42. Accordingly, the only path for ink out of the container is through the port 42.

The underside 36 of the valve body also includes an integrally formed projecting flange 46. The flange 46 defines a peripheral shoulder against which the upper edge 48 of the shell 30 fits to be heat-staked or bonded thereto. When the shell 30 is attached, therefore, the manifold and the ink container 22 are enclosed by the shell and valve body.

The valve holder 24 is also integrally formed with the valve body 20 to project from the outer surface 50 of the valve body. The valve holder generally comprises a hollow cylindrical member into which tightly fits the valve 26. The valve is, like the valve body, formed of high-density polyethylene by, for example, injection molding.

The valve includes a central conduit 52, the main length of which generally slightly tapers inwardly from the outer surface 54 of the valve. The conduit is centered on the axis 56 about which the valve rotates, as explained more fully below. The conduit 52 terminates at its inner end in a branch 58 that extends radially from the axis 56 and opens through the wall of a frustum-shaped valve seat boss 60 that protrudes from the remaining portion of the valve. The valve seat boss 60 conforms to the shape of the valve seat opening 40 and fits tightly therein.

Rotation of the valve 26 about the axis 56 permits the alignment of conduit branch 58 with the port 42 formed in the manifold, thereby to provide fluid communication from the ink container through the port, branch and conduit and into a receptacle to which the valve may be joined, as explained below.

In instances in which the valve 26 is made by an injection-molding process, it is preferred to include voids, such as shown at 25, to facilitate even cooling of the molded part and reduce the amount of material required.

The valve keeper 28 generally comprises an annular member that fits over the outer edge of the holder 24 and is attached thereto by adhesives or heat-staking. The valve 26 is recessed within the holder 24, and three spaced-apart legs 62 that are integrally formed with the keeper 28 extend downwardly along the inside of the holder 24 into contact with the valve. From each leg 62 there protrudes at the bottom thereof feet 64 that have planar undersides that engage the flat outer surface 54 of the valve.

The keeper, valve and holder are sized so that when the keeper is in place, the undersides of the feet 64 firmly hold the valve 26 against the valve body 20, thereby to prevent leaks between the valve and the valve body. In this regard, it is noteworthy that the material from which the valve body and valve are made is high-density polyethylene, which can be generally characterized as a non-wetting material. Accordingly, very little capillarity is developed between the valve and valve body for drawing or wicking ink between those components. Moreover, the ink container 22 is not pressurized nor elasticized so that when the ink container 22 is filled, there is very little pressure on the ink to flow from the bag.

As best shown in FIGS. 1-3, the valve is provided with keyways 70. Preferably, there are three spaced-apart keyways formed in the valve. The keyways 70 extend along the side of the valve in a direction parallel to the axis 56 of rotation of the valve. The keyways 70 extend from the surface 54 of the valve to a location near the opposite surface of the valve. The keyways 70 receive keys 94 of an actuator 90 that is operated for rotating (hence, opening or closing) the valve, as explained next.

Figure 5:
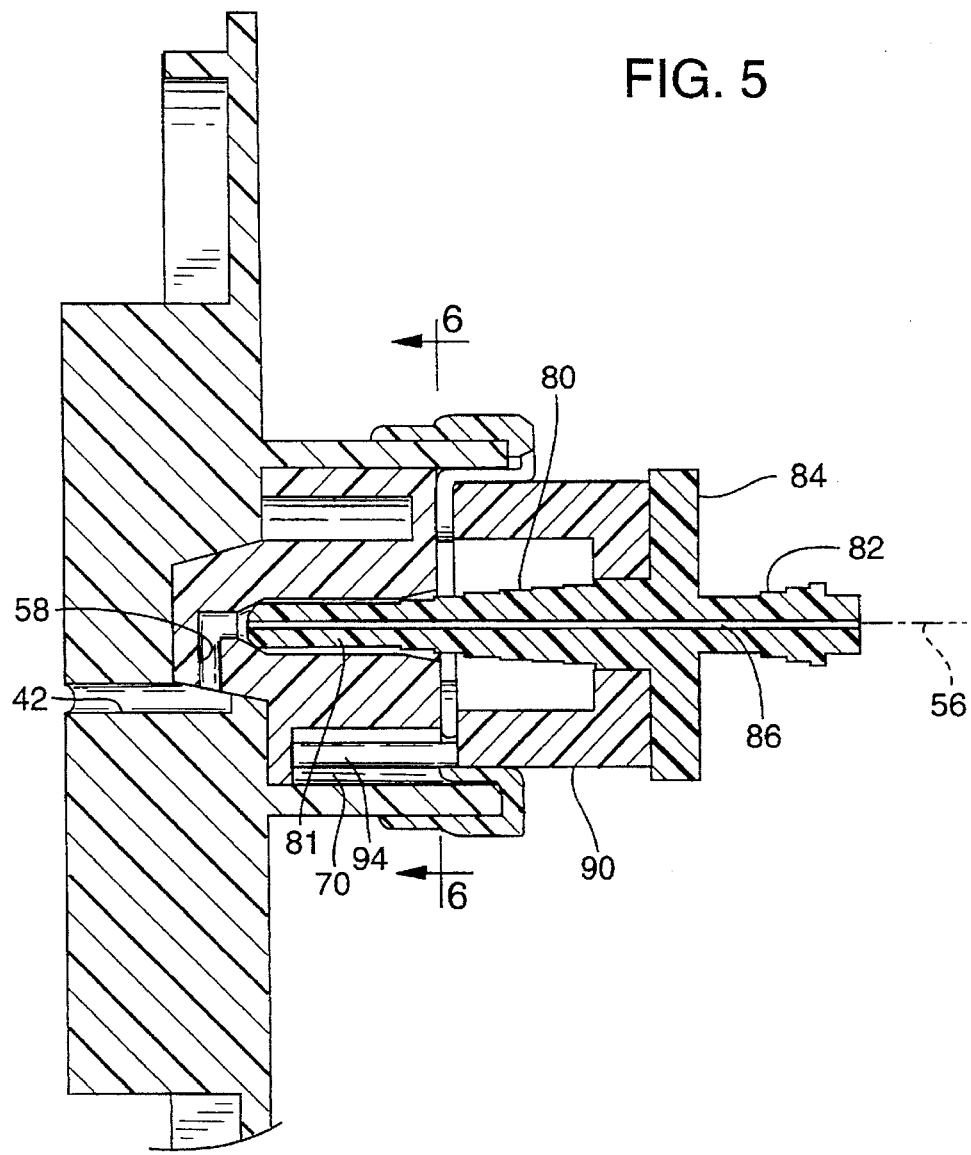
FIG. 5 is a cross-sectional view showing the valving, receptacle and actuator mated when the ink container is connected to a printer.
Figure 6:
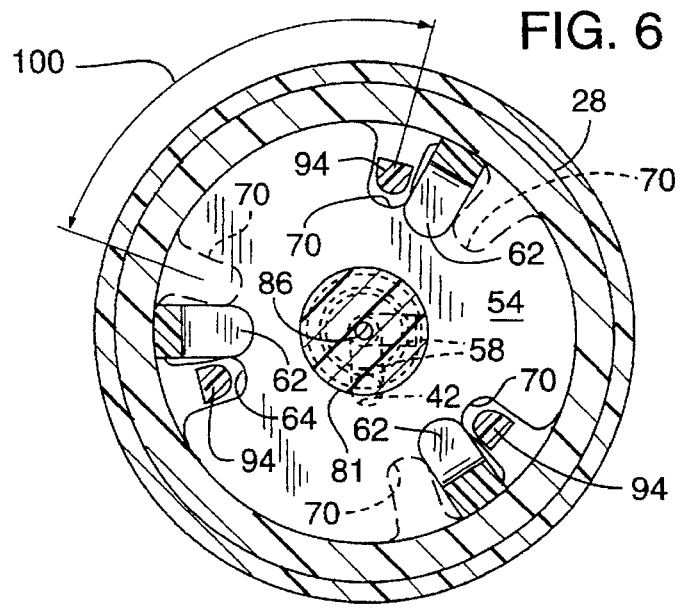
FIG. 6 is a cross-section taken along line 6—6 of FIG. 5.

FIGS. 4-6 depict a receptacle 80 and valve actuator 90 assembly that may be mounted within an ink-jet printer and to which the full container is mated to supply ink from the container to the receptacle and from the receptacle to the print heads of the printer. More particularly, the receptacle 80 generally comprises an elongated plastic needle having a tapered tip 81 that conforms to the taper of the conduit 52 that is formed in the valve. A passage 86 is defined completely through the receptacle 80 to permit the flow of ink from the container through the receptacle.

The opposite end of the receptacle defines a connector 82 to which a tube may be connected for delivering ink from the receptacle through the tube to a reservoir of a conventional ink-jet print head (not shown). The receptacle 80 also includes a cylindrical flange 84 that protrudes radially therefrom. Preferably, the receptacle 80 is mounted to be stationary; that is, irrotational within the printer.

Rotatably mounted around the receptacle 80 adjacent to the flange 84 is a valve actuator 90 that generally comprises a cylindrical sleeve 92 from which protrudes three keys 94. The keys 94 are configured and arranged to fit within the keyways 70 within the valve. An annular shoulder 96 is formed at the junction of the keys 94 and the remaining portion of the sleeve 92.

When a filled ink container is to be connected to a printer, the valve of the container is inserted in a manner such that the keys 94 mate with the keyways 70 of the valve. The container is moved against the actuator 90 until the shoulder 96 in the actuator sleeve 92 abuts the outer surface 54 of the valve. It is noteworthy that when such abutment takes place, the tip 81 of the receptacle is snugly engaged with the valve conduit 52.

Once engagement of the ink container valve with the receptacle 80 and actuator 90 is made, the actuator is rotated approximately one-quarter turn about the axis 56 of the valve. Such rotation brings the conduit branch 58 into fluid communication with the port 42 in the manifold, thereby opening the valve as shown in FIG. 5. A partly full or empty container may thereafter be removed by rotating the valve back one-quarter turn to close the valve. The container can then be disconnected from the actuator and receptacle without leaking.

It will be appreciated that the rotation of the actuator can be accomplished by any of a number of mechanisms, or manually. To this end, the actuator is provided with a lever arm 98 that may be moved by the user or by conventional mechanisms carried by the printer to rotate the valve member into and out of the open position. Alternatively, the ink container may be installed in the printer body, and the actuator can be thereafter advanced into engagement with the valve in a manner that the sleeve 92 follows helical guide members that rotate the actuator and valve as the actuator is advanced to full engagement with the valve. In such an embodiment, it is noteworthy that the receptacle tip 81 is first fully engaged with the valve before the actuator is advanced to open the valve.

FIG. 6 shows in solid lines the position of the keyways 70 and keys 94 when the valve is in the open position so that the conduit branch 58 is in fluid communication with the port 42 and the valve body. The conduit branch 58 is shown as approximately in the 6 o'clock position. To disconnect the empty or partly full container from the printer, the actuator is rotated about axis 56 through an angle 100 into a position, shown in dashed lines, whereby the valve moves into a closed position such that the branch 58 shown in about the 3 o'clock position is occluded by the wall of the valve seat opening 40, and the port 42 is occluded by the wall of the valve boss 60. Accordingly, movement of the valve into the closed position prevents the flow of ink through the port and valve.

FIG. 7 shows an alternative mechanism for keeping a valve 126 tightly seated with a valve body 120 without the use of a discrete keeper member. In this regard, the valve 126 is formed to include prongs 127 that project therefrom and fit through elongated apertures 129 formed in the valve body 120. The prongs have barbed tips that snap through the openings and bear against the edge 144 of the valve body to firmly hold the valve against the valve body. A snap ring 128 is formed in the holder 124 and located so that when the valve is fully inserted into the holder, the surface 154 of the valve will snap against the ring 128. It will be appreciated that the prongs 127 and ring 128 may be used alone as well as in combination, as shown in FIG. 7.

As noted earlier, the valve is recessed within the holder. One reason to so recess the valve is to minimize the chance that the valve will be inadvertently rotated by the user during normal handling of the ink container. It is also noted that the tight fit of the valve within the holder is intended to be sufficient enough to prevent the valve from being rotated by hand, thereby preventing inadvertent opening of the valve. In the embodiment shown in FIG. 7, a cap 140 is attached to substantially close the outer end of the holder 124. The cap serves to hide the keyways in the valve, exposure of which keyways would tempt the curious user to rotate the valve by hand or with the aid of a paper clip or pen.

Preferably, the cap 140 is formed of a low-density polyethylene and includes a central opening 142 therein. When such a capped valve is mated with the actuator and receptacle as described above, the cap 140 deforms to yield to the tip and keys of the actuator. When the container is detached from the actuator, the cap resumes its position to substantially hide the valve from the user.

Although the foregoing has been described in connection with preferred and alternative embodiments, it will be appreciated by one of ordinary skill in the art that various modifications and variations may be substituted for the mechanisms and method described here without departing from the invention as defined by the appended claims and their equivalents.

The invention claimed is:

1. An apparatus for valving the flow of ink from an ink container, comprising:

a container for containing ink;

a valve body attached to the container and having a port defined therein for conducting flow of ink from the container through the valve body;

a valve mounted to the body and rotatable between an open position and a closed position, the valve also having a conduit formed therein for conducting ink therethrough;

a receptacle configured to mate with the conduit, thereby to receive within the receptacle ink that flows through the conduit;

a rotatable valve actuator mounted adjacent to the receptacle, a selected one of the rotatable valve actuator and the valve having a key that protrudes therefrom to engage a mating keyway provided on the other of the selected valve actuator and valve, respectively, so that rotation of the actuator rotates the valve.

2. The apparatus of claim 1 wherein the container, valve body and valve are made of the same plastic material.

3. The apparatus of claim 1 wherein the valve and valve body are sized so that the valve tightly fits within the valve body, thereby to resist rotation of the valve by hand.

4. The apparatus of claim 1 wherein the valve includes a keyway formed therein, the valve being adapted thereby to receive in the keyway a key for rotating the valve.

5. The apparatus of claim 1 further comprising a keeper member mounted to the valve body to press the valve into contact with the valve body.

6. The apparatus of claim 1 wherein the valve body defines a cylindrical holder within which the valve is rotatably mounted, the valve being recessed within the holder.

7. The apparatus of claim 6 further comprising a keeper member mounted to the valve body to press the valve into contact with the valve body, wherein the keeper comprises an annular member attached to the holder.

8. The apparatus of claim 1 further comprising keeper prongs mounted to the valve to protrude therefrom to engage the valve body, thereby to press the valve against the valve body.

9. A valving assembly for an ink container comprising:

a valve body connectable to a container a valve mounted to the body and rotatable between an open position and a closed position, the valve having a keyway formed therein, the valve also having a conduit formed therein for conducting ink therethrough;

a receptacle configured to mate with the conduit, thereby to receive within the receptacle ink that flows through the conduit; and a rotatable valve actuator mounted adjacent to the receptacle and having a key that protrudes therefrom to engage the valve keyway so that rotation of the actuator rotates the valve.

10. The assembly of claim 9 wherein the valve body includes a manifold though which is defined a port that is placed in fluid communication with the conduit whenever the valve is in the open position.

11. The assembly of claim 10 wherein the manifold is substantially flat.

12. The assembly of claim 11 further comprising a collapsible plastic container connected to the flat manifold thereby to contain ink that can flow through the port and conduit when the valve is in the open position.

13. The assembly of claim 12 further comprising a keeper mounted to the valve body for keeping the valve pressed against the valve body thereby to prevent ink from leaking from the closed valve.

14. The assembly of claim 13 wherein the valve, valve body, container, and keeper are made of the same material.

15. The assembly of claim 9 wherein the valve and valve body are made of the same material.

16. The assembly of claim 9 wherein the valve body defines a holder portion within which the valve is recessed.

17. The assembly of claim 9 further comprising keeper prongs mounted to the valve to protrude therefrom to engage the valve body, thereby to keep the valve pressing into contact with the valve body.

18. A method of valving a replaceable ink container, comprising the steps of:

fastening the container to a valve body, through which body is formed a port for conducting flow of ink from the container through the valve body;

securing to the valve body a valve that is rotatable into and out of an open position that connects the port with a conduit formed in the valve for conducting ink from the port and through the conduit;

engaging the valve with a receptacle that is configured to mate with the conduit thereby to receive within the receptacle ink that flows through the conduit; and rotating the valve into the open position.

19. The method of claim 18 including the step of providing the valve, valve body, and container to be made from the same plastic material.

* * * * *